United States Patent [19]
Johnson

[11] 3,935,838
[45] Feb. 3, 1976

[54] LIVESTOCK MINERAL DISPENSER

[76] Inventor: Eldon E. Johnson, R.R. No. 1, Box 247, Nokomis, Ill. 62075

[22] Filed: Dec. 10, 1973

[21] Appl. No.: 423,391

[52] U.S. Cl. ................................. 119/54
[51] Int. Cl.² ............................... A01K 5/00
[58] Field of Search ............... 119/53, 54, 51.5

[56] References Cited
UNITED STATES PATENTS

| | | | |
|---|---|---|---|
| 2,640,464 | 6/1953 | Jindrich | 119/54 |
| 2,834,320 | 5/1958 | Tolley | 119/53 |
| 3,782,332 | 1/1974 | Depenthal | 119/51.5 X |

*Primary Examiner*—Hugh R. Chamblee
*Attorney, Agent, or Firm*—McCaleb, Lucas & Brugman

[57] ABSTRACT

A dispenser particularly suitable for use with minerals, salt or hygroscopic feed supplements for livestock comprises: a hopper for mineral storage; a feeding trough situated at the bottom of the hopper; plural spatially separated and overlapping baffle plates extending downwardly and inwardly in the hopper; and mineral agitator means having an actuating member located within the trough for movement by livestock feeding therefrom, the baffle plates being operable to enable free operational movement of the agitator means by limiting the mineral quantity in contact therewith. Baffle means laterally and downwardly converging from the hopper toward the trough limit mineral flow into the latter. Mineral flow from the hopper into the trough is determined in accordance with movement of the agitator means by feeding livestock.

2 Claims, 3 Drawing Figures

U.S. Patent    February 3, 1976    3,935,838
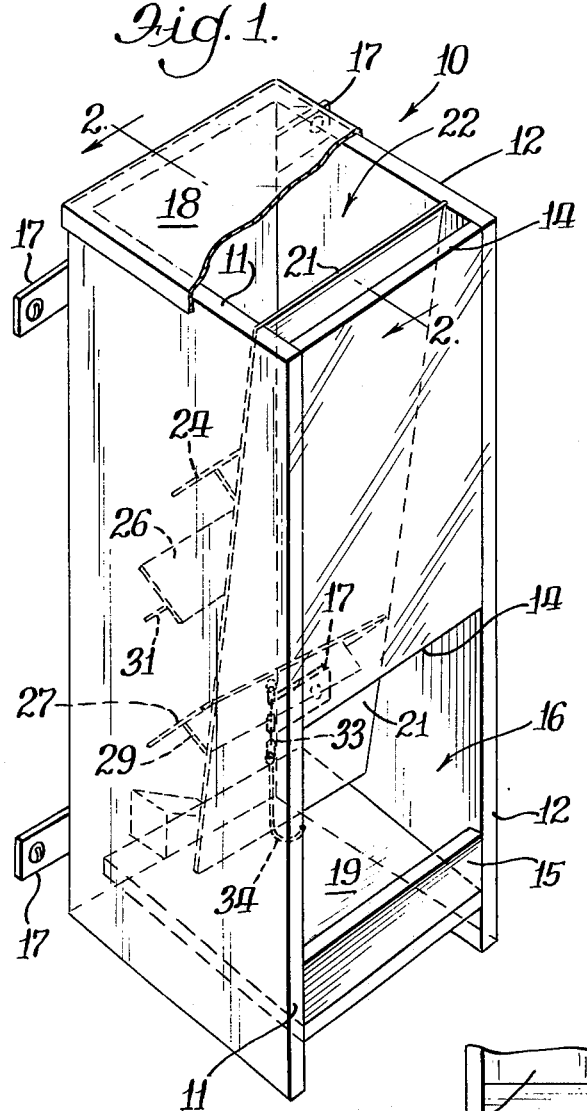
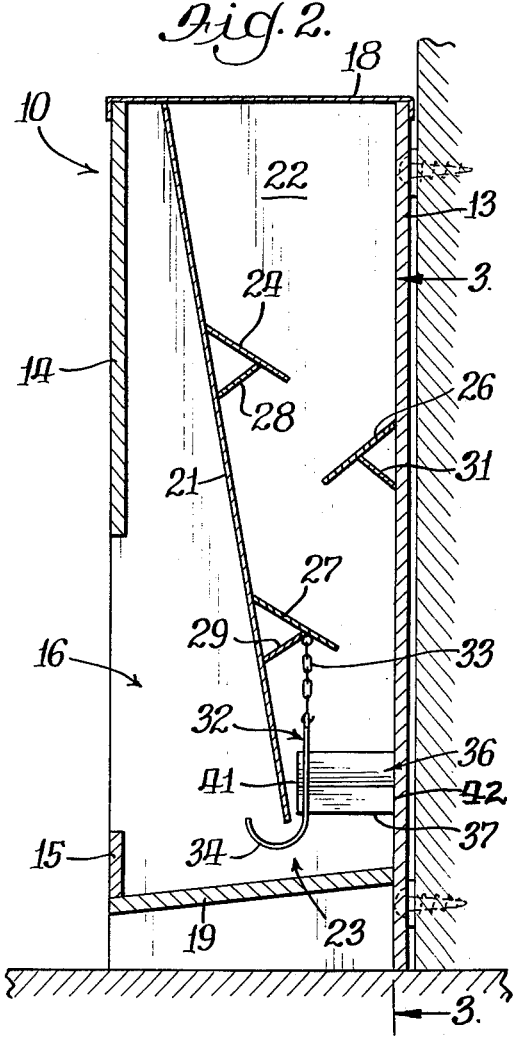
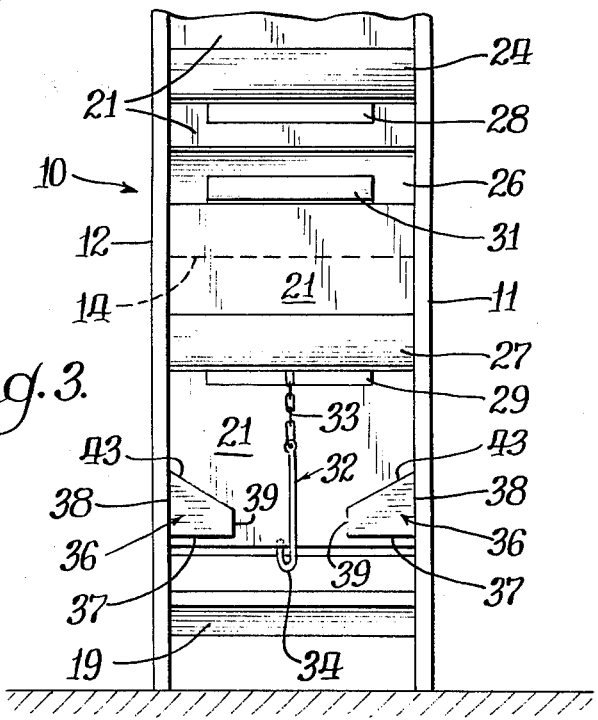

LIVESTOCK MINERAL DISPENSER

BACKGROUND OF THE INVENTION

This invention relates in general to automatic livestock feeders and, more particularly, to those feeders particularly suitable for use with minerals, salt or hygroscopic livestock feed supplements.

DESCRIPTION OF THE PRIOR ART

Automatic livestock feeders have heretofore been provided for storing and dispensing livestock feed for periodic consumption in response to movement of an agitating device by feeding livestock. See, for example, Stafford U.S. Pat. No. 2,330,454, issued Sept. 28, 1943 and entitled "Stock Feeder;" and Jindrich U.S. Pat. No. 2,640,464, issued June 2, 1953 and entitled "Agitating Type Stock Feeder." These patents are believed to be representative of the prior art.

Although prior known livestock feeders typified by the devices disclosed in the foregoing patents are suitable for use with livestock feeds, such devices have been found to be unsatisfactory for storing and periodically dispensing minerals, salt or hygroscopic feed supplements over an extended period as livestock ingest only several ounces of the latter at any given feeding time. As will be readily appreciated by those familiar with raising livestock, minerals, salt or hygroscopic livestock feed supplements, while being stored in an automatic livestock feeder over a period of time generally on the order of at least one week, have a tendency to become compacted into a solid mass upon absorption of moisture, thereby becoming lodged in the automatic livestock feeder to clog and jam the agitator and rendering the automatic livestock feeder inoperable. Furthermore, such devices are of relatively complicated design and hence are difficult and expensive to manufacture.

Need has therefore arisen for an improved, efficient and reliable livestock feed dispenser which is simple in design, inexpensive to manufacture and is suitable for storing and dispensing minerals, salt or hygroscopic livestock feed supplements.

SUMMARY OF THE INVENTION

The present invention is directed toward such an improved device, and is operable to periodically and automatically dispense a fresh supply of minerals, salt or hygroscopic feed supplements without jamming its agitator. Specifically, the present invention comprises: a hopper for mineral storage; a feed trough situated at the bottom of the hopper; plural spatially separated and overlapping baffle plates extending downwardly and inwardly in the hopper; mineral agitator means suspended from the lowest of the baffle plates, the agitator means having an actuating member thereof located within the trough for movement by livestock feeding therefrom, the baffle plates being operable to enable free operational movement of the agitator means by limiting the mineral quantity in contact therewith. Baffle means laterally and downwardly converging from the hopper toward the trough limit mineral flow into the latter. Mineral flow from the hopper into the trough is determined in accordance with movement of the agitator means.

It is an important object of this invention to provide an improved automatic livestock mineral dispenser which is suitable for use with minerals, salt or hygroscopic feed supplements without jamming.

Another important object of this invention is to provide an improved livestock mineral dispenser which is efficient in operation, simple in design and inexpensive to manufacture.

A still further object of this invention is to provide a livestock mineral dispenser which is portable and easily mounted in a field.

Numerous other objects and advantages of the present invention will be apparent from the following description, which, when taken in conjunction with the accompanying drawings, discloses a preferred embodiment thereof.

BRIEF DESCRIPTION OF THE DRAWINGS

FIG. 1 is a perspective view which illustrates the basic features of the livestock mineral dispenser of the present invention;

FIG. 2 is a vertical sectional view taken substantially on the line 2—2 of FIG. 1; and FIG. 3 is a vertical sectional view taken substantially on the line 3—3 of FIG. 2 as seen from the rear of the dispenser.

DESCRIPTION OF THE PREFERRED EMBODIMENT

Turning now to the preferred embodiment of the present invention, reference is initially made to FIGS. 1 and 2. As shown therein, the livestock mineral dispenser 10 of the present invention comprises a simple, inexpensively manufactured and portable device having generally rectangular side walls 11 and 12 and a rear wall 13. An upper front wall 14 and a lower front wall 15 partially enclose the front of the dispenser 10 to provide a front opening 16 from which the livestock feed. Side walls 11 and 12, rear wall 13 and front walls 14, 15 are preferably made of wood, and are rigidly joined by nails or screws in a well-known manner. Upper and lower mounting brackets 17 are rigidly secured to the rear wall 13 and are provided for securing the feed supplement dispenser 10 to a tree or other suitable mounting device by screws or bolts.

The mineral dispenser 10 further comprises a removable top cover 18, preferably constructed of steel, and having edge portions adaptable to overlap and securely fit the upper outside edges of side walls 11 and 12, rear wall 13 and upper front wall 14. A floor 19, preferably constructed of wood, is secured to side walls 11 and 12, rear wall 13 and lower front wall 15 to slope downwardly from the rear wall toward the lower front wall 15, as best shown in FIG. 2. Included within the dispenser 10 is a partition 21, preferably constructed of steel, terminating at its lower end in spaced relation to the floor 19 and rigidly attached to side walls 11 and 12 to slope from the top of the dispenser near its upper front wall 14 rearwardly and downwardly toward the floor 19 to provide, in conjunction with side walls 11 and 12 and rear wall 13, a hopper 22 for mineral storage. A feeding trough 23, situated at the bottom of the dispenser 10, is defined by side walls 11 and 12, rear wall 13, lower front wall 15 and floor 19, access being made to this trough 23 through opening 16.

Dispenser 10 further comprises a plurality of spatially separated and overlapping baffle plates or other suitable deflecting means 24, 26 and 27 extending downwardly and inwardly to define a serpentine channel in hopper 22. Baffle plates 24 and 26 are preferably made of metal and welded to partition 21 and are respectively supported by welded support members 28 and 29, as best shown in FIGS. 2 and 3. Baffle plate 26 slopes downwardly and forwardly from, and is rigidly secured to the rear wall 13 by bracket 31, and is located intermediate the baffle plates 24 and 27.

A mineral agitator means 32 is suspended from the lowest baffle plate 27 to be equidistantly located from side walls 11 and 12 by means of a chain 33 spaced rearwardly from the partition 21, the agitator means comprising a hook-shaped actuating member 34 located within the trough 23 for movement by livestock while feeding therefrom. Agitator means 32 is operable, upon movement by livestock to dislodge and break apart compacted minerals, salt or hygroscopic feed supplements stored within the hopper 22, the chain suspension having been found to be most effective for this purpose. The baffle plates 24, 26 and 27 are operable to enable free operational movement of the agitator means 32 by limiting the mineral quantity in the hopper 22 in contact therewith.

The dispenser 10 further includes side baffle means 36 within, and laterally and downwardly converging toward the center of, the hopper 22 for limiting mineral flow into the central portion of trough 23. Baffle means 36 preferably comprise a pair of oppositely disposed six-sided wood blocks, each having a horizontal base 37, a long end 38 and a short end 39 vertically parallel thereto, trapezoidal front and rear faces 41 and 42, and a top surface 43 laterally and downwardly sloping toward the agitator means 32 in the center of the trough 23. The long end 38 of each baffle means 36 is secured to one of the side walls 11 or 12, preferably by nails or wood screws. The sloping faces 43 provide deflecting baffle surfaces operable to limit gravity mineral flow into the central portion of the trough 23.

In the operation of the dispenser 10, upon removal of the top cover 18, minerals, salt or hygroscopic feed supplement is poured into the hopper 22. The baffle plates 24, 26 and 27 are operable to enable free operational movement of the agitator means 32 by limiting the quantity and hence the weight of minerals or other contents of the hopper 22 in contact therewith. Baffle means 36 direct the mineral flow from the hopper 22 into the central portion of the trough 23, the flow being determined in accordance with movement of the agitator means 32 upon movement of actuating member 34 by livestock instinctively and periodically feeding from trough 23. The result is that a fresh supply of livestock minerals is provided at all times, loosened or dislodged particles thereof falling to floor 19 of the trough 23 where they are retained until consumed by the feeding livestock. Little waste and contamination therefore occurs.

It is thought that the invention and many of its attendant advantages will be understood from the foregoing description, and it is apparent that various changes may be made in the form, construction and arrangement of its component parts without departing from the spirit and scope of the invention or sacrificing all of its material advantages, the form described being merely a preferred embodiment thereof.

I claim:

1. A livestock mineral dispenser comprising: a downwardly and rearwardly sloping partition for bounding a hopper for mineral storage; plural spatially separated and overlapping baffle plates secured to said partition to extend downwardly and inwardly in said hopper; an additional baffle plate secured to the interior of said hopper to extend downwardly and inwardly therewithin and intermediate said baffle plates secured to said partition; mineral agitator means and a chain spaced rearwardly from said partition for suspending said agitator means from the lowest of said baffle plates, said agitator means having an actuating member thereof located within said trough for movement by livestock feeding therefrom, said baffle plates being operable to enable free operational movement of said agitator means by limiting the mineral quantity in contact therewith; and side baffle means within, and laterally and downwardly converging toward the center of said hopper for limiting mineral flow into said trough; whereby mineral flow from said hopper into said trough is determined in accordance with movement of said agitator means.

2. The dispenser of claim 1, wherein said baffle plates are three in number defining a serpentine channel in said hopper.

* * * * *